(12) United States Patent
Chu et al.

(10) Patent No.: US 9,352,758 B2
(45) Date of Patent: May 31, 2016

(54) FLEXIBLE DIRECT DRIVE BOGIE

(75) Inventors: Yongping Chu, Jiangsu (CN);
Yongming Tang, Jiangsu (CN); Zunwei Feng, Jiangsu (CN); Dingxiang Hu, Jiangsu (CN); Rui Zhou, Jiangsu (CN)

(73) Assignee: CSR NANJING PUZHEN CO., LTD., Nanjing, Jiangsu (CN)

( * ) Notice: Subject to any disclaimer, the term of this patent is extended or adjusted under 35 U.S.C. 154(b) by 289 days.

(21) Appl. No.: 14/354,047

(22) PCT Filed: Jul. 17, 2012

(86) PCT No.: PCT/CN2012/000962
§ 371 (c)(1),
(2), (4) Date: May 7, 2014

(87) PCT Pub. No.: WO2014/008616
PCT Pub. Date: Jan. 16, 2014

(65) Prior Publication Data
US 2014/0261061 A1    Sep. 18, 2014

(30) Foreign Application Priority Data
Jul. 10, 2012    (CN) .......................... 2012 1 0238324

(51) Int. Cl.
*B61F 3/04*    (2006.01)
*B61F 5/38*    (2006.01)
*B61F 5/40*    (2006.01)
(Continued)

(52) U.S. Cl.
CPC ... *B61F 3/04* (2013.01); *B61C 9/50* (2013.01); *B61F 5/26* (2013.01); *B61F 5/38* (2013.01); *B61F 5/40* (2013.01); *B61F 5/52* (2013.01); *Y02T 30/10* (2013.01)

(58) Field of Classification Search
CPC ................ B61F 3/04; B61F 5/04; B61F 5/16; B61F 5/24; B61F 5/38; B61F 5/40; B61F 5/52; B61C 9/50
See application file for complete search history.

(56) References Cited

U.S. PATENT DOCUMENTS

| 827,710 | A | * | 8/1906 | Conaty | ..................... B61F 5/38 105/165 |
| 1,232,917 | A | * | 7/1917 | Head | ........................ B61F 3/04 105/139 |

(Continued)

FOREIGN PATENT DOCUMENTS

| CN | 201172412 Y | 12/2008 |
| CN | 201189868 Y | 2/2009 |

(Continued)

OTHER PUBLICATIONS

International Search Report and Written Opinion of International Application No. PCT/CN2012/000962 mailed Apr. 18, 2013.

*Primary Examiner* — Zachary Kuhfuss
(74) *Attorney, Agent, or Firm* — Ping Wang; Andrews Kurth LLP

(57) ABSTRACT

The present invention relates to a flexible direct-drive bogie and implements a flexible frame by using a flexible cross beam, so as to make it easy for left and right side-frames to nod relatively to adapt to a larger twist of a track. As the frame is flexible, a primary suspension of the present invention is simplified to a thin layer of rubber pad, so that the production cost is reduced. Flexible drive devices enable flexible suspension of a permanent magnetic motor, and at the same time, can transmit torque, improve transmission efficiency, and reduce a weight of a transmission mechanism.

9 Claims, 7 Drawing Sheets

(51) Int. Cl.
*B61F 5/26* (2006.01)
*B61C 9/50* (2006.01)
*B61F 5/52* (2006.01)

(56) References Cited

U.S. PATENT DOCUMENTS

| | | | | | |
|---|---|---|---|---|---|
| 3,038,416 | A | * | 6/1962 | Janeway | B61F 5/24 105/193 |
| 3,313,245 | A | * | 4/1967 | Sundby | B61F 3/08 105/193 |
| 3,774,550 | A | * | 11/1973 | Lich | B61F 5/16 105/182.1 |
| 3,828,692 | A | * | 8/1974 | Kreissig | B61F 5/24 105/135 |
| 4,353,309 | A | * | 10/1982 | Pollard | B61F 3/04 105/136 |
| 4,428,301 | A | * | 1/1984 | Jackson | B61F 3/08 105/168 |
| 4,429,637 | A | * | 2/1984 | Jackson | B61F 3/08 105/168 |
| 4,538,524 | A | * | 9/1985 | Eggert, Jr. | B61F 3/04 105/182.1 |
| 4,625,653 | A | * | 12/1986 | Jackson | B61F 3/04 105/168 |
| 4,760,799 | A | * | 8/1988 | Jackson | B61F 5/24 105/182.1 |
| 4,787,318 | A | * | 11/1988 | Vogel | B61F 3/04 105/136 |
| 4,841,873 | A | * | 6/1989 | Goding | B61F 3/04 105/168 |
| 5,086,706 | A | * | 2/1992 | Boivin | B61F 5/24 105/168 |
| 2012/0279416 | A1 | * | 11/2012 | Nishimura | B61C 9/50 105/218.1 |
| 2016/0023670 | A1 | * | 1/2016 | Sato | B61F 5/46 105/182.1 |

FOREIGN PATENT DOCUMENTS

| | | | | |
|---|---|---|---|---|
| CN | 101565049 A | | 10/2009 | |
| CN | 101823491 A | | 9/2010 | |
| CN | 202765007 U | | 3/2013 | |
| FR | 3014397 | * | 12/2013 | ............... B61C 9/50 |
| KR | 20020041708 A | | 6/2002 | |
| WO | 9608402 A1 | | 3/1996 | |

* cited by examiner

FLEXIBLE DIRECT DRIVE BOGIE

This application is a national entry of PCT/CN2012/000962, filed on Jul. 17, 2012, which claims priority of Chinese Application No. 201210238324.X, filed on Jul. 10, 2012. The entirety of all of the aforementioned applications is incorporated herein by reference.

FIELD

The present invention relates to a flexible direct-drive bogie, belonging to the railbound vehicle bogie technology.

BACKGROUND

The traditional bogie generally uses H-shaped frame and rigid cross beams, relying on the primary vertical flexible suspension to overcome the distortion and irregularity of a rail. When wheelsets pass the transition curve, part of the rigid frame bears greater torque effect due to the high curved track. Moreover, when speed is fast, the connecting part between the frame and the primary vertical flexible suspension also bears a greater force. In the traditional structural design of a bogie, the motor is mounted on the frame. In order to allow the dynamic disturbance between the motor and wheelsets as well as to transmit torque, complex mechanisms such as coupling and gear box need to be arranged. This kind of bogie has complex structure, low productivity, larger distance of shaft, and greater weight, therefore performance indicators such as small radius curved-track negotiation, energy saving and submissiveness to the line irregularity cannot be improved significantly.

The search found a Chinese invention patent CN101565049 B, which discloses a bogie of hinged frame linear electric motor. Two T-shaped frames are respectively hinged on the central cross beam through rubber nodes. The side part of the central cross beam is connected to the upper traction cross beam through a longitudinal rod. The traction cross beam is connected to the first side cross beam and the second side cross beam through a hydraulic damper. The central cross beam is connected to the linear motor through the traction rod. This design can improve the bogie, transmit traction force, and improve the traction effect of the linear motor.

When wheelsets pass the transition curve, the two hinge points can be moderately distorted under a bigger torque to protect the frame. According to the files, the bogie realizes flexibility through the rubber nodes of hinges. According to the model of vehicle, different rubber nodes need to be designed for the bogie. The structure realizes torsion through rubber nodes. The performance parameters of rubber nodes have great discreteness. As the environment temperature changes, the performance parameters of rubber nodes are often quite different from the design value. At the same time rubber is liable to aging and cracking with poor reliability and relatively short service life. And the motor is still arranged on the bogie, the distance of shaft on the shaft is larger, therefore the various performance indexes of the bogie are not improved significantly.

Figure 1:
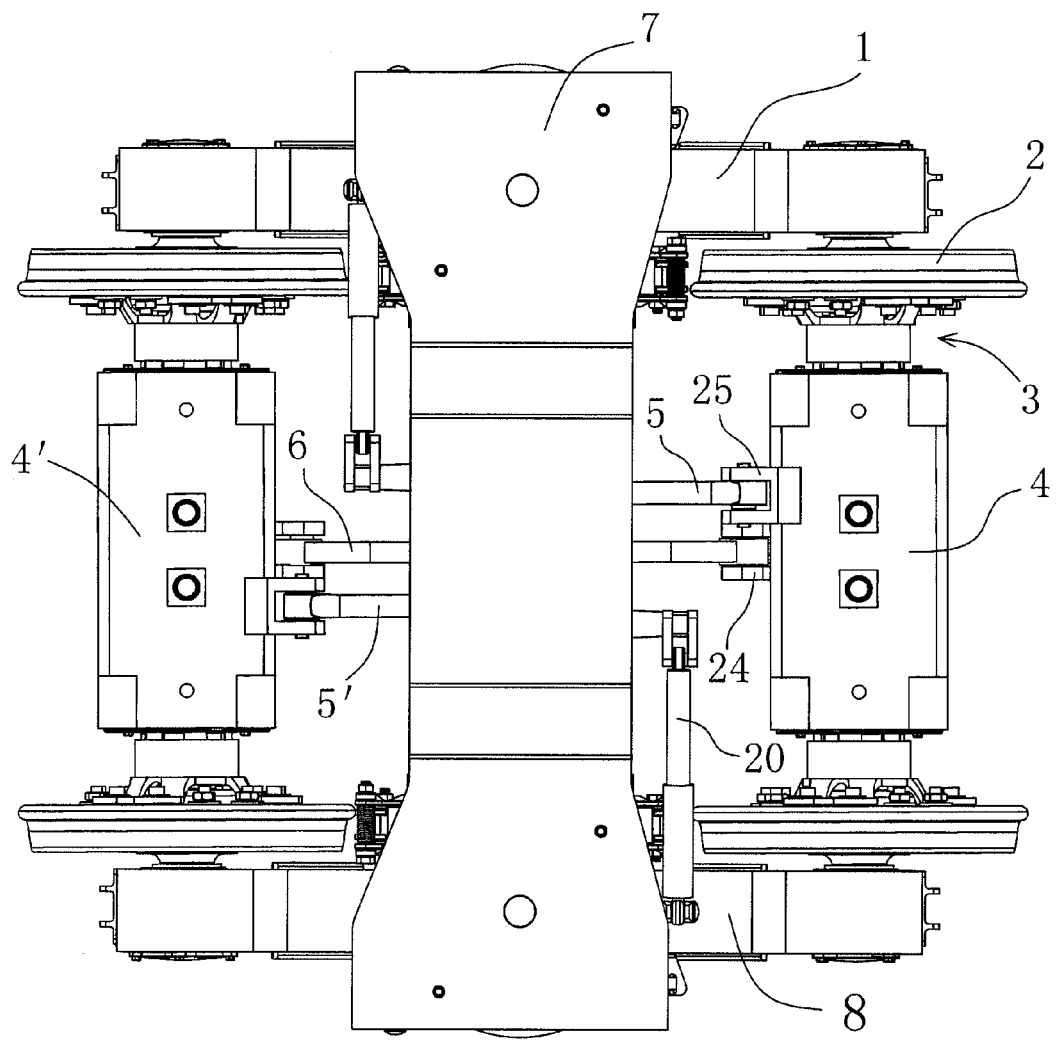
FIG. 1 is the vertical view of the structure of this invention—flexible direct-drive bogie.
Figure 2:
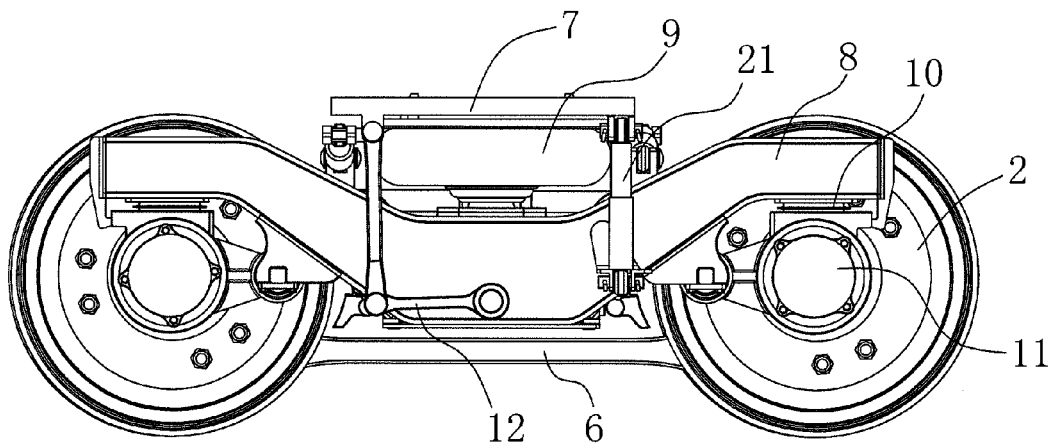
FIG. 2 is the front view of the structure of this invention—flexible direct-drive bogie.

The mark numbers in the diagram mean: 1—left sideframe, 2—wheel, 3—flexible drive devices, 4—permanent magnetic motor, 4'—permanent magnetic motor, 5—traction rod, 5'—traction rod, 6—longitudinal linking rod, 7—bridge plate, 8—right side-frame, 9—air spring, 10—rubber pad, 11—axle box, 12—anti-roll bar, 13—flexible cross beam, 14—flange disc, 15—rubber joint, 16—connection, 17—axle bushing, 18—traction rod bracket, 19—traction body, 20—secondary lateral damper, 21—secondary vertical damper, 22—lateral stop bracket, 23—flexible stop buffer, 24—first mounting bracket, 25—second mounting bracket, 26—swing arm bracket, 27—anti-roll bar bracket, 28—secondary lateral damper bracket, 29—flexible stop buffer bracket.

DETAILED DESCRIPTION

It is an object of the present invention to overcome the shortcomings of the prior art and to provide a flexible direct-drive bogie.

In order to solve the technical problems, the invention provides a flexible direct-drive bogie, comprising: a bogie frame, two permanent magnetic motors respectively arranged at a front side and a rear side of the bogie frame, an air spring arranged on the top of the bogie frame, and front and rear wheelsets arranged at the bottom of the bogie frame, said bogie frame comprising a left side-frame and a right sideframe, wherein: middle parts of said left side-frame and right side-frame are fixedly integrally connected to each other through a flexible cross beam constituted by four steel plates, gaps are left among the four steel plates, an axle of each of said wheelsets passes through a central through-hole arranged in the permanent magnetic motor, output shafts at two ends of the permanent magnetic motor are fixed to two wheels of the wheelset respectively through flexible drive devices, so as to hang the permanent magnetic motor in the middle of the wheelset, housings of the two permanent magnetic motors are connected to each other through a longitudinal linking rod, a bridge plate for fixedly connecting to a vehicle body is crossly arranged on the top of the air spring, a traction rod bracket is mounted at a central location of a lower end face of the bridge plate, the traction rod bracket is provided with a traction body, and a traction rod is mounted on each of the left and right ends of the traction body, wherein one traction rod is connected to the housing of the permanent magnetic motor on the front side and the other traction rod is connected to the housing of the permanent magnetic motor on the rear side.

The invention is further improved in that:

(1) The said flexible drive device comprises two ends respectively connected to the output shaft of the permanent magnetic motor and a flange disc of the wheel, an inner end of the flange disc has an axle bushing matching with the output shaft of the permanent magnetic motor, an outer end of the flange disc is fixed to an inner end face of the wheel through a connection, and said connection is fixedly connected to the wheel by means of a stud sleeved by a rubber joint.

(2) A first end of the connection and the wheel are provided with round holes, the round holes arranged on the wheel are distributed around a periphery of the axle, the stud sleeved by the rubber joint passes through the round hole of the wheel and the round hole of a first end of the connection and fixes the wheel with the connection through a nut, a second end of the connection is provided with a pin column, and said pin column passes through the round hole arranged on the outer end of the flange disc, so that the flange disc is hung on the pin column. Rubber joints have the capability of moderate elastic deformation, at the same time the pin column at the second end of the connection matches with the round hole in the periphery of the flange disc, to realize a small amount of rotation, and provide vehicle vertical and longitudinal displacement and vibration reduction, the axial elastic deformation and deflection deformation of rubber joints, and the axial direction displacement and vibration reduction together with the connection.

(3) The housing of the permanent magnetic motor is provided with a first mounting bracket for mounting the longitudinal linking rod and a second mounting bracket for mounting the traction rod, two ends of the longitudinal linking rod are respectively hingedly connected to the first mounting brackets of the housings of the front and rear permanent magnetic motors, one end of said traction rod is hingedly connected to the second mounting bracket of the housing of the permanent magnetic motor, the other end is hingedly connected to the traction body, said traction body is hingedly connected to the traction rod bracket, two traction rods and the traction body form a Z-shaped traction rod mechanism, said Z-shaped traction rod mechanism is located on the top of the flexible cross beam, and the longitudinal rod is located at the bottom of the flexible cross beam. The longitudinal linking rod is hinged on the first mounting bracket, to make the permanent magnetic motor swing within a small range. The longitudinal linking rod and the traction rod are respectively positioned at the upper and lower sides of the flexible cross beam, to ensure their normal operation without interfering with each other. The Z-shaped traction rod mechanism is used to evenly transmit the traction force produced by two permanent magnetic motors to the vehicle body (bridge plate).

(4) The invention also has a stopper mechanism for limiting a lateral movement range of the bridge plate, said stopper mechanism comprising flexible stop buffer brackets symmetrically fixed to the lower end face of the bridge plate and lateral stop brackets symmetrically fixed to the middle parts of the left and right side-frames, wherein a flexible stop buffer is mounted on said flexible stop buffer bracket, and when the bridge plate moves laterally to a limit position, the flexible stop buffer on a side in a shift direction of the bridge plate withstands the lateral stop bracket on a corresponding side, so as to stop the bridge plate.

(5) Primary flexible pad bearings are respectively mounted on said left side-frame and right side-frame, and a rubber pad serving as a primary suspension is arranged between said primary flexible pad bearing and an axle box.

(6) The rubber pad is a single-layer rubber pad having a thickness ranging from 30 mm to 100 mm. As the frame is flexible, the primary suspension is simplified to a very thin layer of rubber pad.

(7) The invention also comprises an L-shaped anti-roll bar with two ends respectively connected to a side-frame and the bridge plate, a secondary vertical damper, and a secondary lateral damper.

(8) From a perspective of an end face of the flexible cross beam, said four steel plates are distributed radially and are symmetric in a lateral direction and a vertical direction.

In the present invention, the flexible cross beam connecting the left and right side-frames is constituted by four steel plates and has certain flexibility, so as to make is easy for the left and right side-frames to nod relatively to adapt to a larger twist of a track. With regard to bogies for different projects, according to design requirements, the size of and the angle between the four steel plates can be adjusted and steel with different properties can be selected to change the flexibility of the bogie frame, so as to adapt to different projects. As the frame is flexible, a primary suspension of the present invention is simplified to a very thin layer of rubber pad, so that the production cost is reduced. Flexible drive devices enable flexible suspension of a permanent magnetic motor, and at the same time, can transmit torque, improve transmission efficiency, and reduce a weight of a transmission mechanism. The two ends of the traction rod are connected to the housing of the permanent magnetic motor and the traction body mounted at the bottom of the bridge plate respectively to provide the transmission of the longitudinal traction force and a braking force, so that the traction force and the braking force are directly transmitted to the vehicle body (the vehicle body is arranged rigidly on the bridge plate) instead of being transmitted through the bogie frame, so as to optimize a stress bearing situation of the bogie frame and at the same time, free a length of the traction rod from being limited by the frame structure, such that the traction rod can be made longer, secondary additional rigidity caused by the traction rod is reduced, and ride comfort of a vehicle is improved.

In view of the above, the present invention uses a novel flexible cross beam and at the same time, simplifies a primary suspension element and makes the permanent magnetic motor flexibly mounted on the wheelset to greatly reduce the wheelbase and increase the transmission efficiency, thereby achieving the most ideal design, so that the bogie not only can pass through a relatively small curve but also has a higher critical speed, and meanwhile, is in good compliance with unevenness of a route.

DETAILED DESCRIPTION OF THE EMBODIMENTS

Execution Example 1

As shown in FIG. 1 to FIG. 10, a flexible direct-drive bogie in this embodiment, comprising: a bogie frame, two permanent magnetic motors 4(4') respectively arranged at a front side and a rear side of the bogie frame, an air spring 9 arranged on the top of the bogie frame, and front and rear wheelsets arranged at the bottom of the bogie frame, bogie frame comprising a left side-frame 1 and a right side-frame 8, middle parts of said left side-frame 1 and middle parts of right side-frame 8 are fixedly integrally connected to each other through a flexible cross beam 13 constituted by four steel plates, gaps are left among the four steel plates, an axle of each of wheelsets passes through a central through-hole arranged in the permanent magnetic motor 4(4'), output shafts at two ends of the permanent magnetic motor 4(4') are fixed to two wheels 2 of the wheelset respectively through flexible drive devices 3, so as to hang the permanent magnetic motor 4(4') in the middle of the wheelset, housings of the two permanent magnetic motors 4(4') are connected to each other through a longitudinal linking rod 6, a bridge plate 7 for fixedly connecting to a vehicle body is crossly arranged on the top of the air spring 9, a traction rod bracket 18 is mounted at a central location of a lower end face of the bridge plate 7, the traction rod bracket 18 is provided with a traction body 19, and a traction rod 5 (5') is mounted on each of the left and right ends of the traction body 19, wherein one traction rod 5 is connected to the housing of the permanent magnetic motor 4 on the front side and the other traction rod 5' is connected to the housing of the permanent magnetic motor 4' on the rear side. Flexible drive device 3 comprises two ends respectively connected to the output shaft of the permanent magnetic motor 4(4') and a flange disc 14 of the wheel 2, an inner end of the flange disc 14 has an axle bushing 17 matching with the output shaft of the permanent magnetic motor 4(4'), an outer end of the flange disc 14 is fixed to an inner end face of the wheel 2 through a connection 16, and connection 16 is fixedly connected to the wheel 2 by means of a stud sleeved by a rubber joint 15. A first end of the connection 16 and the wheel 2 are provided with round holes, the round holes arranged on the wheel 2 are distributed around a periphery of the axle, the stud sleeved by the rubber joint 15 passes through the round hole of the wheel 2 and the round hole of a first end of the connection 16 and fixes the wheel 2 with the connection 16 through a nut, a second end of the connection 16 is provided with a pin column, and said pin column passes through the round hole arranged on the outer end of the flange disc 14, so that the flange disc is hung on the pin column.

In this embodiment, the permanent magnetic motor 4(4') is provided with a first mounting bracket 24 for mounting the longitudinal linking rod 6 and a second mounting bracket 25 for mounting the traction rod 5(5'), two ends of the longitudinal linking rod 6 are respectively hingedly connected to the first mounting brackets 24 of the housings of the front and rear permanent magnetic motors 4(4'), one end of traction rod 5(5') is hingedly connected to the second mounting bracket 25 of the housing of the permanent magnetic motor 4(4'), the other end is hingedly connected to the traction body 19, the traction body 19 is hingedly connected to the traction rod bracket 18, two traction rods 5(5') and the traction body 19 form a Z-shaped traction rod mechanism, Z-shaped traction rod mechanism is located on the top of the flexible cross beam, and the longitudinal rod is located at the bottom of the flexible cross beam.

Figure 3:
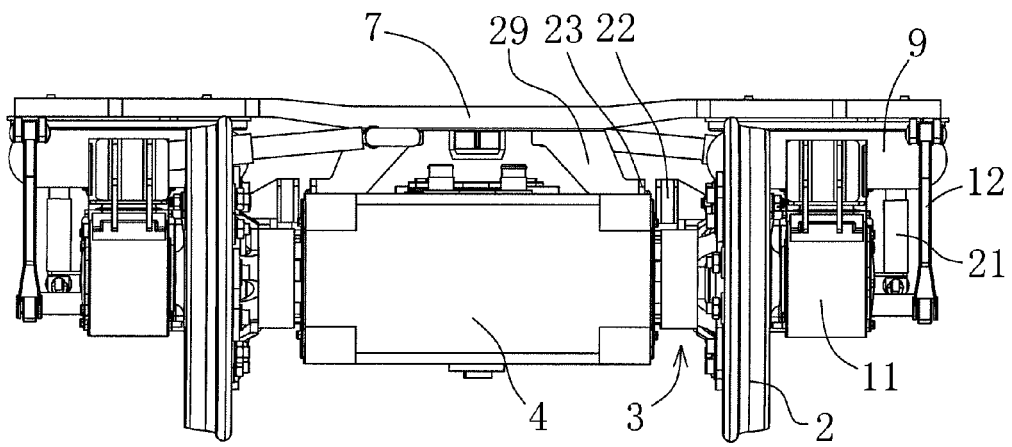
FIG. 3 is the right side view of the structure of this invention—flexible direct-drive bogie.
Figure 4:
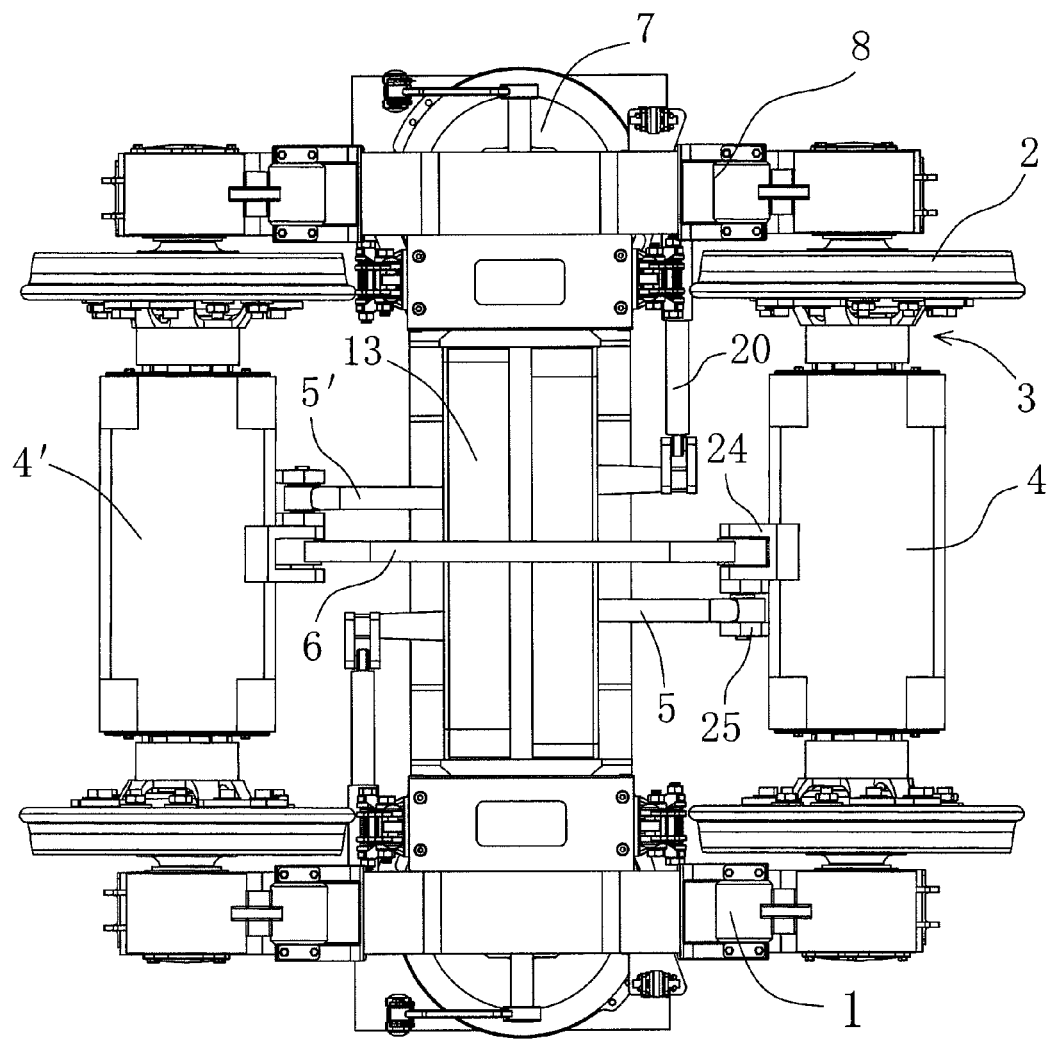
FIG. 4 is the bottom view of the structure of this invention—flexible direct-drive bogie.
Figure 5:
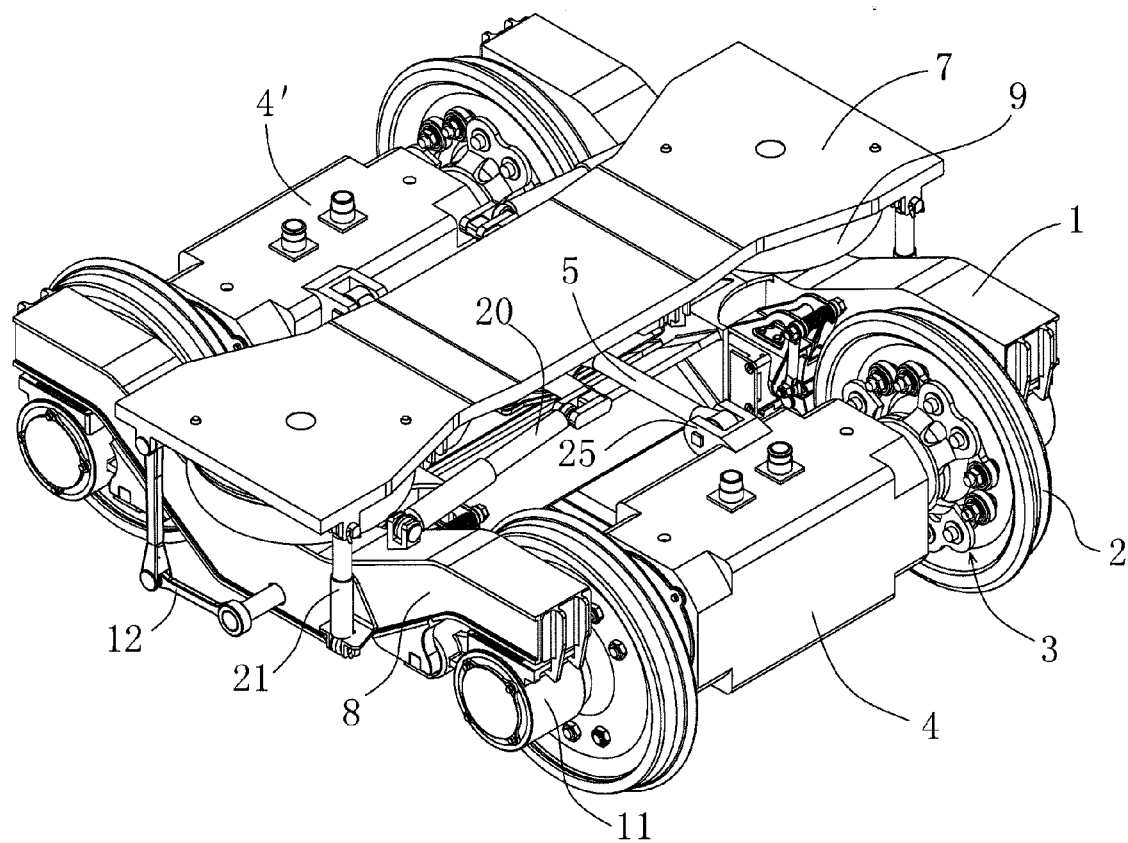
FIG. 5 is the graphic model of the structure of this invention—flexible direct-drive bogie.
Figure 6:
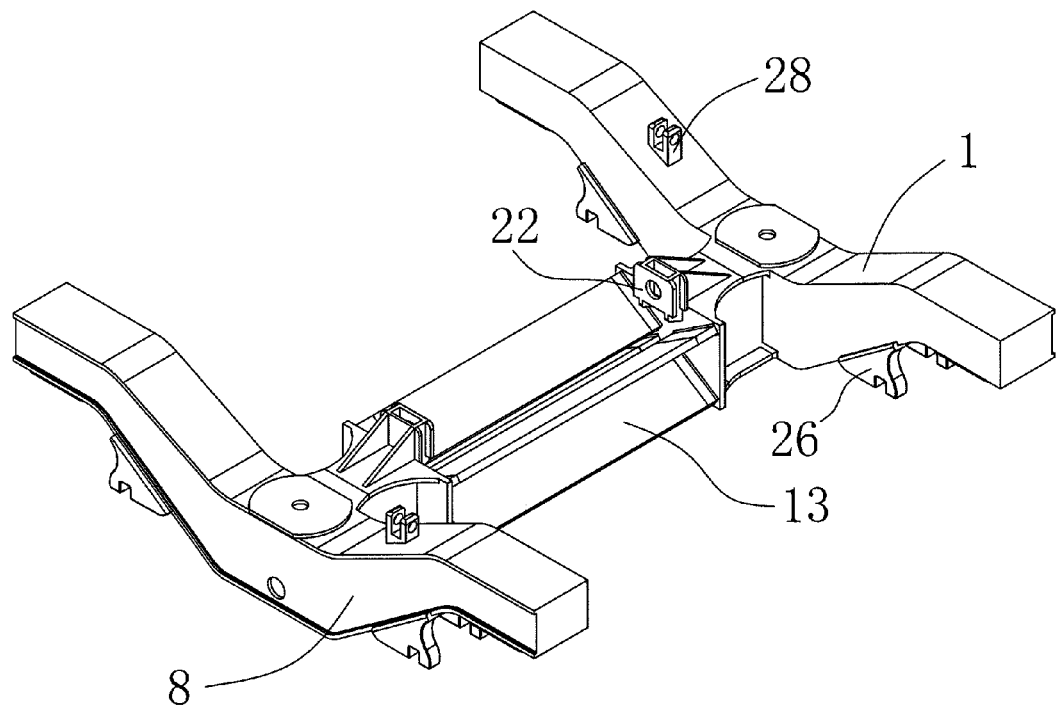
FIG. 6 is the frame structure diagram of this invention—flexible direct-drive bogie.
Figure 7:
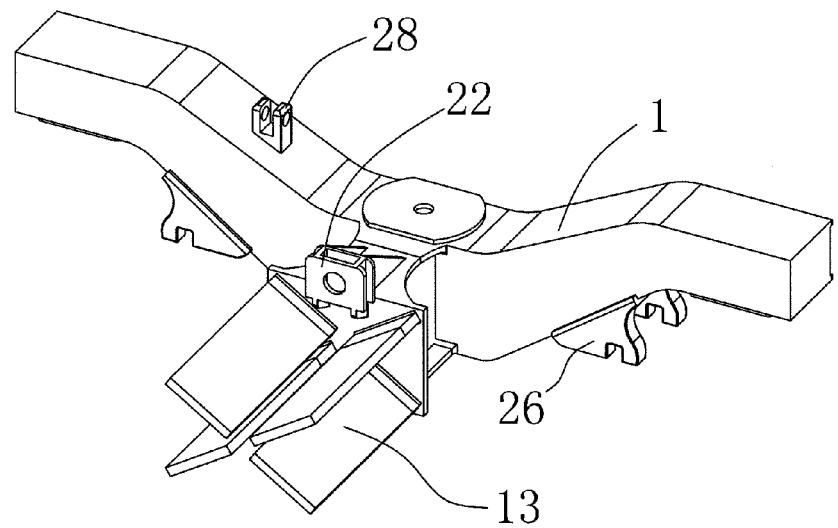
FIG. 7 is the cutaway view of this invention—flexible direct-drive bogie.
Figure 8:
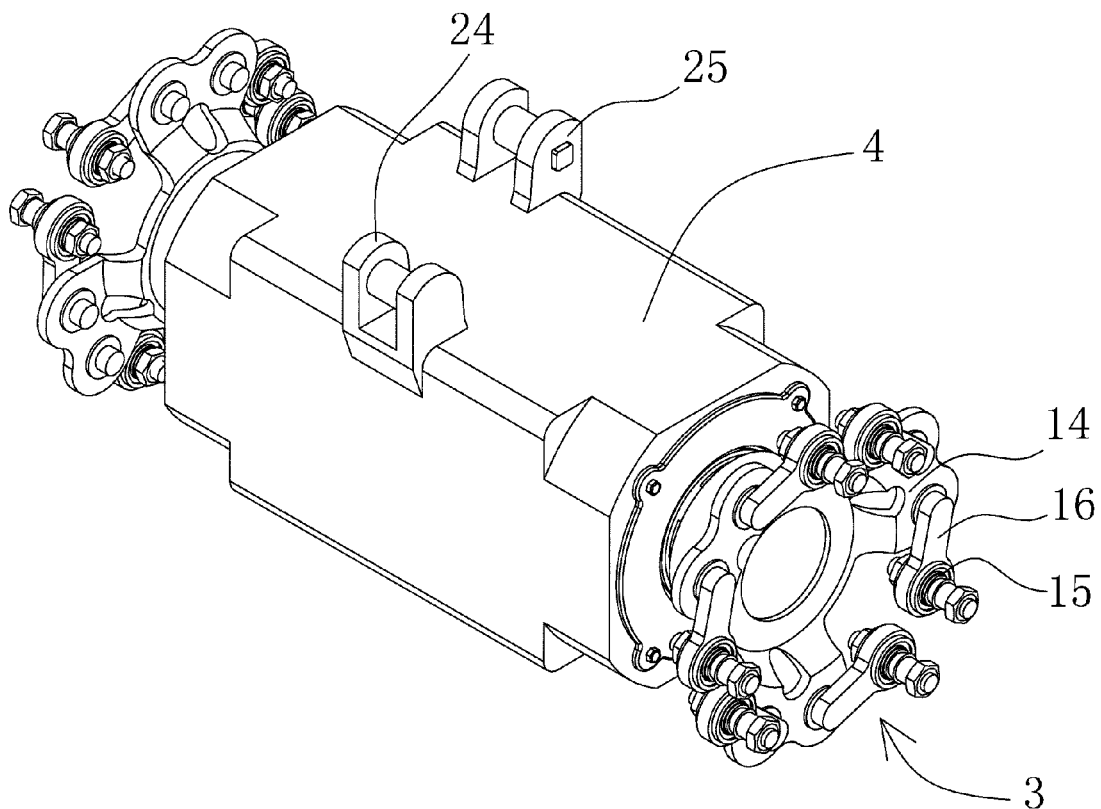
FIG. 8 is the structure diagram of permanent magnetic motor and flexible drive devices of this invention—flexible direct-drive bogie.
Figure 9:
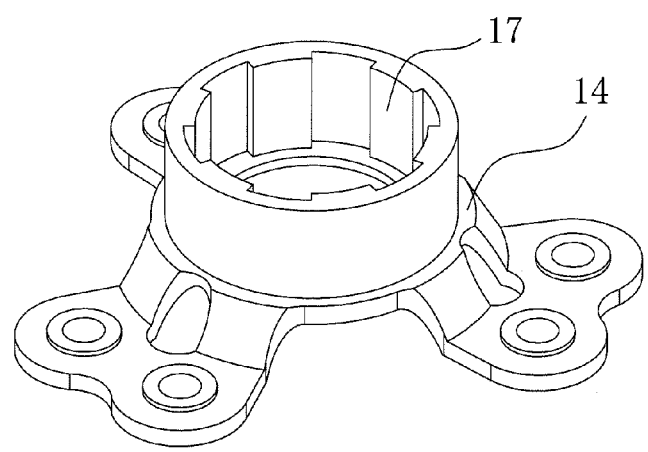
FIG. 9 is the structure diagram of flange disc of the flexible drive devices of this invention—flexible direct-drive bogie.
Figure 10:
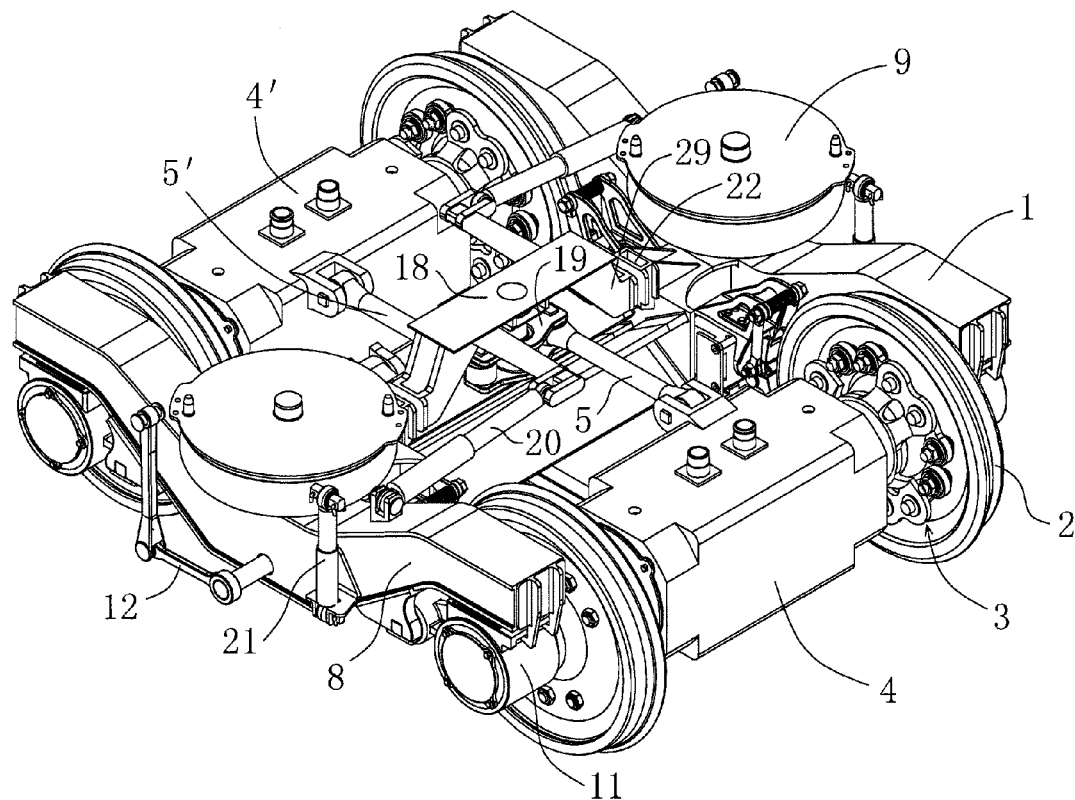
FIG. 10 is the graphic model of the structure of this invention—flexible direct-drive bogie (without bridge plate).

As shown in FIG. 3, FIG. 6 and FIG. 7, this invention—the flexible direct-drive bogie also has a stopper mechanism for limiting a lateral movement range of the bridge plate 7, the stopper mechanism comprising flexible stop buffer brackets 29 symmetrically fixed to the lower end face of the bridge plate 7 and lateral stop brackets 22 symmetrically fixed to the middle parts of the left 1 and right 8 side-frames, wherein a flexible stop buffer 23 is mounted on flexible stop buffer bracket 29, and when the bridge plate 7 moves laterally to a limit position, the flexible stop buffer 23 on a side in a shift direction of the bridge plate 7 withstands the lateral stop bracket 22 on a corresponding side, so as to stop the bridge plate 7.

Due to the use of flexible frame, the single stage suspension in this embodiment is simplified. The detailed structure is as below: primary flexible pad bearings are respectively mounted on left side-frame 1 and right side-frame 8, and a rubber pad 10 serving as a primary suspension is arranged between primary flexible pad bearing and an axle box 11. The rubber pad 10 is a single-layer rubber pad having a thickness ranging from 30 mm to 100 mm. The thickness of the rubber pad in this embodiment is 40 mm.

Besides, the flexible direct-drive bogie in this embodiment also comprises an L-shaped anti-roll bar 12 with two ends respectively connected to a side-frame and the bridge plate 7, a secondary vertical damper 21, and a secondary lateral damper 20.

Figure 11:
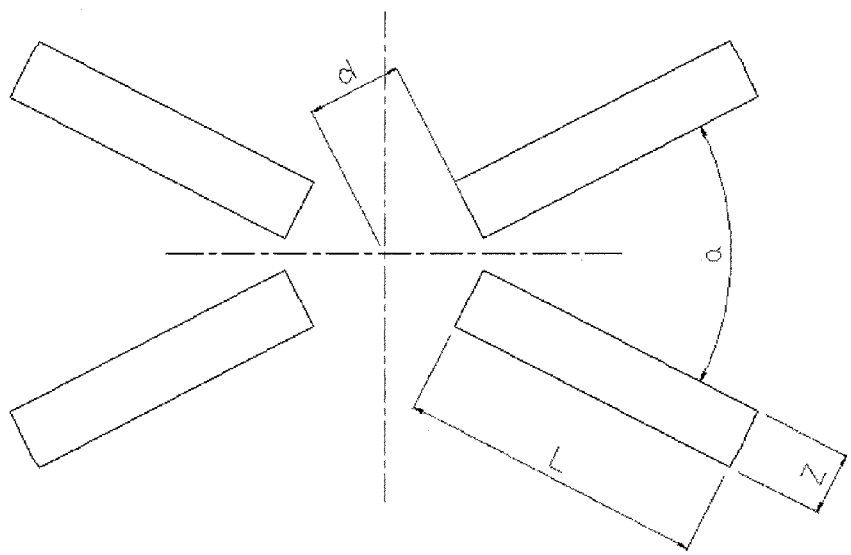
FIG. 11 is the end face view of the flexible cross beam of this invention—flexible direct-drive bogie.

As shown in FIG. 11, from a perspective of an end face of the flexible cross beam, four steel plates are distributed radially and are symmetric in a lateral direction and a vertical direction.

The shear stiffness of the frame is related to the snakelike stability of the vehicle. The torsion rigidity of the left and right side-frames is related to the compliant rail distortion of the vehicle's route. In design, the four parameters shown in FIG. 11 can be changed according to demand of the said two properties for different vehicles. The four parameters are: distance (d) from the inner side edge of the steel plate to the intersection point of the lateral and vertical symmetric lines, thickness of steel plate (Z), width of steel plate (L), included angle between the steel plates ($\alpha$) and the length of steel plate. Thus the torsion rigidity and shear stiffness can be adjusted to meet the demands of different project. The flexible cross beam after adjustment can be analogue simulated in the computer to see if it is satisfactory to the design requirements. If it isn't, it will be adjusted again. The detailed adjustment method will not be elaborated in the application hereof.

In this example, d=30 mm, L=135 mm; Z=30 mm, the length of steel plate is 1845 mm, the included angle $\alpha$ is 40°, the wheel base of the bogie is 1800 mm, and the material of steel plate is P275. By analysis, the torsion rigidity is 0.226 MN.m/rad and the shear stiffness is 62.9 MN.m/rad. The smaller torsion rigidity is suitable for worse route, while the large shear stiffness can assure the snakelike stability of the vehicle.

Execution Example 2

Embodiment 2 is the same as embodiment 1 in terms of structure and differs from embodiment 1 in terms of flexible cross beam parameters. In the present embodiment, d=38 mm, L=120 mm, Z=25 mm, a length of a steel plate is 1100 mm, an angle between steel plates a equals 66°, a wheelbase of a bogie is 1800 mm, a material of the steel plate is P275, the frame torsional rigidity obtained by means of resolution is 0.315 MN.m/rad, and the shearing rigidity is 102.98 MN.m/rad. The less torsion rigidity can adapt to a worse route, and the greater shearing rigidity can ensure higher serpentine stability of a vehicle.

Apart from the above-mentioned execution examples, the invention hereof also has other modes of execution. Whatever technical schemes derived from equivalent replacement or equivalent transformation are all fallen into the protective scope required in the invention hereof.

What is claimed is:
1. A flexible direct-drive bogie, comprising: a bogie frame, two permanent magnetic motors respectively arranged at a front side and a rear side of the bogie frame, an air spring arranged on the top of the bogie frame, and front and rear wheelsets arranged at the bottom of the bogie frame, said bogie frame comprising a left side-frame and a right side-frame, wherein: middle parts of said left side-frame and right side-frame are fixedly integrally connected to each other through a flexible cross beam constituted by four steel plates, gaps are left among the four steel plates, an axle of each of said wheelsets passes through a central through-hole arranged in the permanent magnetic motor, output shafts at two ends of the permanent magnetic motor are fixed to two wheels of the wheelset respectively through flexible drive devices, so as to hang the permanent magnetic motor in the middle of the wheelset, housings of the two permanent magnetic motors are connected to each other through a longitudinal linking rod, a bridge plate for fixedly connecting to a vehicle body is crossly arranged on the top of the air spring, a traction rod bracket is mounted at a central location of a lower end face of the bridge plate, the traction rod bracket is provided with a traction body, and a traction rod is mounted on each of the left and right ends of the traction body, wherein one traction rod is connected to the housing of the permanent magnetic motor on the front side and the other traction rod is connected to the housing of the permanent magnetic motor on the rear side.

2. The flexible direct-drive bogie according to claim 1, wherein: said flexible drive device comprises two ends respectively connected to the output shaft of the permanent magnetic motor and a flange disc of the wheel, an inner end of the flange disc has an axle bushing matching with the output shaft of the permanent magnetic motor, an outer end of the flange disc is fixed to an inner end face of the wheel through a connection, and said connection is fixedly connected to the wheel by means of a stud sleeved by a rubber joint.

3. The flexible direct-drive bogie according to claim 2, wherein: a first end of the connection and the wheel are provided with round holes, the round holes arranged on the wheel are distributed around a periphery of the axle, the stud sleeved by the rubber joint passes through the round hole of the wheel and the round hole of a first end of the connection and fixes the wheel with the connection through a nut, a second end of the connection is provided with a pin column, and said pin column passes through the round hole arranged on the outer end of the flange disc, so that the flange disc is hung on the pin column.

4. The flexible direct-drive bogie according to claim 3, wherein: the housing of the permanent magnetic motor is provided with a first mounting bracket for mounting the longitudinal linking rod and a second mounting bracket for mounting the traction rod, two ends of the longitudinal linking rod are respectively hingedly connected to the first mounting brackets of the housings of the front and rear permanent magnetic motors, one end of said traction rod is hingedly connected to the second mounting bracket of the housing of the permanent magnetic motor, the other end is hingedly connected to the traction body, said traction body is hingedly connected to the traction rod bracket, two traction rods and the traction body form a Z-shaped traction rod mechanism, said Z-shaped traction rod mechanism is located on the top of the flexible cross beam, and the longitudinal rod is located at the bottom of the flexible cross beam.

5. The flexible direct-drive bogie according to claim 4, wherein: a stopper mechanism for limiting a lateral movement range of the bridge plate, said stopper mechanism comprising flexible stop buffer brackets symmetrically fixed to the lower end face of the bridge plate and lateral stop brackets symmetrically fixed to the middle parts of the left and right side-frames, wherein a flexible stop buffer is mounted on said flexible stop buffer bracket, and when the bridge plate moves laterally to a limit position, the flexible stop buffer on a side in a shift direction of the bridge plate withstands the lateral stop bracket on a corresponding side, so as to stop the bridge plate.

6. The flexible direct-drive bogie according to claim 5, wherein: primary flexible pad bearings are respectively mounted on said left side-frame and right side-frame, and a rubber pad serving as a primary suspension is arranged between said primary flexible pad bearing and an axle box.

7. The flexible direct-drive bogie according to claim 6, wherein said rubber pad is a single-layer rubber pad having a thickness ranging from 30 mm to 100 mm.

8. The flexible direct-drive bogie according to claim 7, further comprising: an L-shaped anti-roll bar with two ends respectively connected to a side-frame and the bridge plate, a secondary vertical damper, and a secondary lateral damper.

9. The flexible direct-drive bogie according to claim 2, wherein: from a perspective of an end face of the flexible cross beam, said four steel plates are distributed radially and are symmetric in a lateral direction and a vertical direction.

* * * * *